US012801466B2

(12) United States Patent
Bhargava

(10) Patent No.: US 12,801,466 B2
(45) Date of Patent: Nov. 17, 2026

(54) SOFTWARE EXTENSION VIA SEMANTIC MODEL

(71) Applicant: SAP SE, Walldorf (DE)

(72) Inventor: Apoorv Bhargava, Bangalore (IN)

(73) Assignee: SAP SE, Walldorf (DE)

( * ) Notice: Subject to any disclaimer, the term of this patent is extended or adjusted under 35 U.S.C. 154(b) by 562 days.

(21) Appl. No.: 17/972,766

(22) Filed: Oct. 25, 2022

(65) Prior Publication Data

US 2024/0134721 A1 Apr. 25, 2024
US 2024/0231960 A9 Jul. 11, 2024

(51) Int. Cl.
*G06F 9/54* (2006.01)
*G06F 8/61* (2018.01)
*G06F 16/28* (2019.01)

(52) U.S. Cl.
CPC ................ *G06F 9/541* (2013.01); *G06F 8/61* (2013.01); *G06F 16/288* (2019.01)

(58) Field of Classification Search
USPC .......................................................... 719/328
See application file for complete search history.

(56) References Cited

U.S. PATENT DOCUMENTS 7,802,238 B2 * 9/2010 Clinton ............. G05B 23/0213 717/136
2012/0259891 A1 * 10/2012 Edoja ..................... G06Q 30/02 707/E17.005
2013/0227516 A1 * 8/2013 Kriegsman ......... G06F 11/3668 717/101
2015/0378742 A1 * 12/2015 Harrington ......... G06F 9/44526 719/318
2016/0063037 A1 * 3/2016 Savkli ................... G06F 16/532 707/722
2021/0382928 A1 * 12/2021 Danilchenko ....... G06F 16/2455
2022/0019742 A1 * 1/2022 Bhamidipaty ......... G06N 5/022
2022/0100778 A1 * 3/2022 Krishnan .............. G06F 16/283

* cited by examiner

*Primary Examiner* — Chat C Do
*Assistant Examiner* — William C Wood
(74) *Attorney, Agent, or Firm* — Buckley, Maschoff & Talwalkar LLC

(57) ABSTRACT

Provided is a system and method directed to a process of extending a software application using a semantic model as the logic of the extension. A parallel architecture is created by the extension which allows the software application to process logic from a semantic model (e.g., a graph) and process logic from source programming code. In one example, the method may include generating an extension comprising logic for a software application hosted on a host platform. The logic may include an entity-based semantic model, The method may further include deploying the extension within the software application on the host platform, wherein the deploying includes modifying programming logic of the software application to execute the entity-based semantic model, and activating the extension within the software application on the host platform.

12 Claims, 7 Drawing Sheets

170

200

240

400

SOFTWARE EXTENSION VIA SEMANTIC MODEL

BACKGROUND

For a software developer to extend the business logic of a software application, typically, the developer must write a new piece of source code with the necessary logic of the extension therein. The new piece of code must be added to the original source code or otherwise integrated with the source code execution flow (e.g., via an extension running side-by-side with the same process, etc.) This coding-based approach enables a previous piece of software code to be extended or otherwise modified to perform additional features. However, this process is costly and slow because it requires an experienced software professional with a deep enough understanding of the underlying code/programming language to be able to modify it which often requires an expert.

Meanwhile, a semantic data model is a high-level semantics-based database description that is designed to capture more meaning of an application environment in terms of "entities" that exist in the application environment, the classifications and/or groupings of these entities, and structural interconnections between the entities. The semantic data model may be in the form of a graph. A semantic-based query language such as SPARQL may be used to query the graph for the data and logic/rules stored therein and execute the rules and logic.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1A:
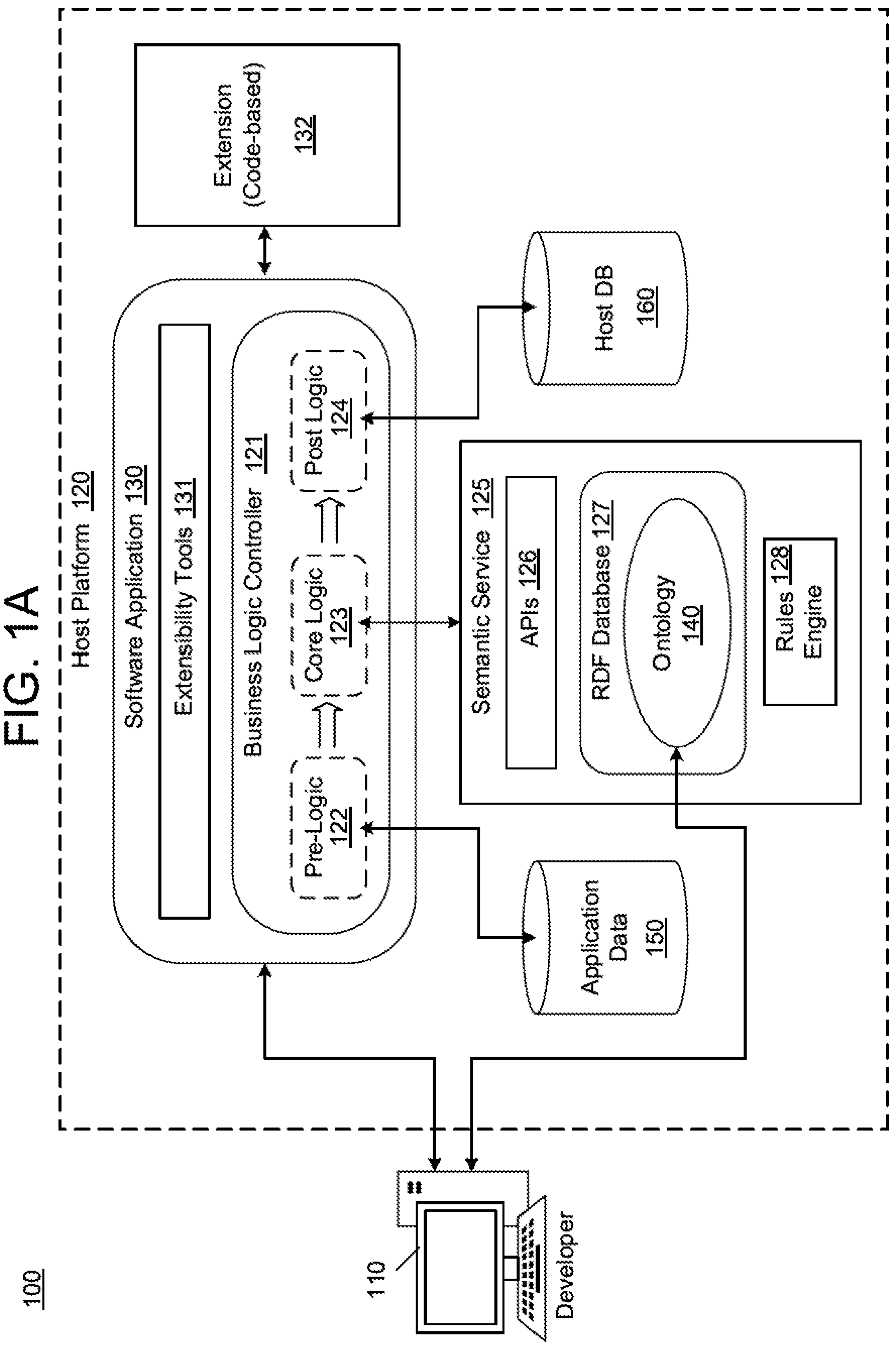
FIG. 1A is a diagram illustrating a host system for extending a software application with a semantic model in accordance with example embodiments.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

The present application is directed to a software extension that can be developed using a knowledge graph-based semantic model. In particular, business logic of the extension can be developed using a knowledge graph instead of programming code. The extension can be deployed (e.g., launched and installed) within a software application that has already been developed using a particular programming language. Accordingly, extensions to a software program can be achieved by generating a graph model/semantic model and not by writing a piece of code. When the extension needs to be updated, the graph model can be updated (e.g., via a user interface, etc.) instead of having to change the underlying source code within an IDE. That is, the change in business logic can be generated by adapting a model and not by writing source code. Furthermore, the extension an add a parallel architecture to the software application that enables the software application to process logic using both traditional source code and graph model logic. Furthermore, the software application can also maintain access to a relational database at the same time/simultaneously.

In today's current practice of coded business logic, the total cost of ownership (TCO) and total cost of development (TCD) for developers can be very high because often an expert understanding of the source code is necessary for such development. In addition, adaptation of business logic and making it available through a hosted software application takes a great deal of time. Furthermore, it is very common for an enterprise cloud application or a cloud-based business application to require specific customizations/adaptations of business logic within the application, for example, based on different currencies, different locations of business, different languages used, and the like.

In the present application, a cloud provider may host a software application in a live runtime environment. Through the cloud provider, a developer of the software application may have access to a number of extensions that can be integrated into their software application to customize the logic therein. For example, extension developers can access a library or catalogue of extensions that are made available by customers, partners, and the like of the cloud provider. Here, an extension developer can scroll through the list and select an extension to add to their software application in their tenant environment. The selections can be detected by the host platform and used to deploy an extension as described herein. The deployment process may include installing the extension within the software application and activating the extensions by launching it. Extension developers or other extension operators can choose any of the extensions to add into their software application. Furthermore, extension developers can customize the logic within the extension using semantic modeling instead of writing source code. For example, the solution may offer a user interface or other tool which enables the developer to access the underlying semantic logic within the graph and make changes on the graph rather than to underlying source code of the application.

According to various embodiments, the business logic within the extensions can be generated with a semantic model (e.g., a graph). The graph may include nodes that represent entities, and the edges interconnecting the nodes that represent relationships among the entities. The entities may refer to individuals, organizations, systems, bits of data, system components, and the like, within the software application.

Furthermore, the "customer" of the cloud provider that develop applications and have them hosted by the cloud provider can access the extensions and make changes to the extensions using graph-based modeling instead of writing programming code. For example, an ontology or knowledge graph with a semantic model representing rules and logic within the extension are available for editing via integrated development environments (IDEs) and other tools.

Some of the unique aspects of the host system described herein include a semantic service that can serve a semantic-based extension into a traditional software application written in a programming language such as Java, C++, Python, or the like. The business logic within the extension can be a semantic model, not programming code. Thus, the extension can be thought of as a graph and not code. The graph can be a knowledge graph that is added to a larger unified graph that is offered by the host system. By installing the semantic model as an extension within the software application, a parallel architecture can be generated in which the software application can access both a relational database and a graph database of the semantic model.

Some of the benefits of the example embodiments include less TCO and TCD for business extensibility because the extension are offered by the cloud provider and the extensions are in graph-based semantic format that can be modified by changing the graph model instead of having to write underlying program code. As a result, the need for specific coding skills can be reduced because the business logic can be extended using graph-based semantic knowledge rather than code Furthermore, the full business logic of the software application can be extended in this way. In addition, new entities and relations can be added to the semantic model and used as part of the extension by the customer themselves.

FIG. 1A illustrates a host system 100 for extending a software application with a semantic model in accordance with example embodiments. Referring to FIG. 1A, a host platform 120 hosts a software application 130 that is developed by a developer 110. For example, the host platform 120 may be a cloud platform, a distributed system, a web server, a database, a combination of systems, and the like. The software application 130 may be developed using a programming language such as Java, or the like, to write the source code. The software application 130 may be accessible to external users (not shown) via a URL or other network address. As just an example, the software application 130 may include a business-based software application such as an enterprise software application that handles functions such as accounting, human resource management, taxes, manufacturing management, supply chain management, and the like.

According to various embodiments, the host platform 120 may install an extension into the software application 130. In this example, the software application 130 includes a business logic controller 121 which is part of the original software application (not the extension). Meanwhile, the host platform 120 includes a semantic service 125, also referred to herein as a semantic "reuse" service. The two components may communicate with one another. For example, the business logic controller 121 may call the semantic service 125 during logic execution of the software application 130. The business logic controller 121 may be installed within the logic of the software application 130 and may replace or otherwise insert semantic processing steps that use the ontology 140 stored in the semantic service 125 instead of traditional programming logic. For example, the business logic controller 121 may include pre-logic 122, core logic 123, and post logic 124.

The pre-logic 122 may include input handling logic. For example, for a tax-based business application (like many other industry cloud solutions) business transaction data of the application can be read from a relational database such as database 150. The input data may also be enriched with configuration data available the database 150 or another storage. Once the required input data is ready, the input may be passed to the core logic 123 of the business logic controller 121 which then executes the business logic based on the semantic model stored within the ontology 140.

In FIG. 1A, the core logic 123 is executed by the semantic service 125 based on the semantic-based graph stored in the ontology 140. The ontology 140 contains the business logic in the form of a graph or other semantic model. Here the domain and application specific functional logic is executed on input data. This can include validation of data as well determination or creation of new data. The business logic is modelled in semantic rules. The business logic controller 121 may synchronously call a semantic rules API 126 and provide the prepared input data from the pre-logic 122 to the semantic service 125 via the API 126 in an API call. In response, the semantic service 125 executes the semantic rules from the ontology 140 on input data and a response is returned to the business logic controller 121 within the software application 130. Next, the business logic controller 121 can further validate this response and proceed to the post processing.

The post logic 124 may include the steps to take with the output of the rules executed by the semantic service 125. For example, the output steps may include storing the generated output in a relational database 160 and/or returning the output to a calling software process or the like. Another function may include delivering a message to a user interface to notify the user that the output has been successfully generated and stored, etc.

The extension can be selected from a catalog or library of available extensions offered by a provider of the host platform 120 or other third-parties that offer the extensions on the host platform 120. The extensions can be modeled using semantic entities rather than using programming code. In this example, the business logic controller 121 enables the software application 130 to process both traditional business logic in source code and extended business logic in the form of a semantic model/graph model.

The semantic service 125 includes a resource data definition (RDF) database 127 in which the ontology 140 is stored. The ontology 140 may include a semantic model (e.g., a graph, etc.) with executable business logic stored therein. Rules can be stored in the nodes of the graph and executed by the semantic service 125. Furthermore, the ontology 140 may include domain entities as nodes, relations and constrains annotated on edges between the nodes, semantic rules encoded in the nodes, data records attached to the nodes, and the like. The semantic service 125 also includes a rule engine 128 that is capable of executing the semantic rules on input data. The rule engine 128 and the ontology 140 may be accessed by the business logic controller 121 via an API 126.

In addition, the semantic service 125 may also provide an IDE or other workspace which the developer 110 can access via the web or other resource and which includes a user interface for modifying the ontology 140 (i.e., the logic of the semantic model that makes up the extension). The business logic controller 121 may manage integration with the semantic service 125. For example, the business logic controller 121 can preprocess the inputs using the pre-logic 122 and post process the output using the post logic 124 received from semantic service 125.

An "enterprise" cloud application often has both business logic modeling requirements and analytics and reporting requirements. In the example embodiments, the software application can interact with an in-memory database (e.g., a relational database, etc). The extension added to the software application 130 in FIG. 1A enables a parallel architecture where both semantic processing via the ontology 140 as well as query processing and other functions of the relational database can be used at the same time.

The business logic controller 121 takes care of end-to-end business logic execution starting from fetching and preparing input data, executing business semantic rules by integrating to the semantic service 125, and then storing the results and output to the relational database so that it can be used for further analytical reporting requirements. This mesh up of different tools and technologies to achieve end to end functionality with greater flexibility is unique. It uses a parallel architecture to serve both modelled business logic based on a RDF database as well as analytical capabilities based on a relational database considering the data volume and performance requirements of the analytical use cases.

The example embodiments can be implemented within a multi-tenant public cloud enterprise solution by considering tenant-aware version management which individually is not a new idea but is required to complete the overall requirement of a public cloud solution and this end-to-end concept can be considered unique. The "tenants" can customize their version of a software application with desired extensions that are developed with a semantic model.

Another unique aspect of the example embodiments is that traditional code-based extensions can also be added to the software application 130. For example, in FIG. 1A, an extension 132 (e.g., a code-based extension, etc.) is added to the software application 130 via traditional extensibility tools 131 that may be part of the software application 130. Thus, the developer 110 has the option to add extensions using semantic modeling or using traditional programming code. Similar to the semantic rule execution, the logic of the extension 132 can also be executed by the business logic controller 121. For example, the business logic controller 121 may execute the logic within the extension 132 before or after the core logic 123 of the extension within the semantic service 125 is executed. In addition, the extension 132 can be used in case semantic rules are not able to serve the complete requirements and more free style code-based extensions are required additionally for subset of the functional extension logic. This mix of semantic rule based and code based extensions is a unique concept.

Figure 1B:
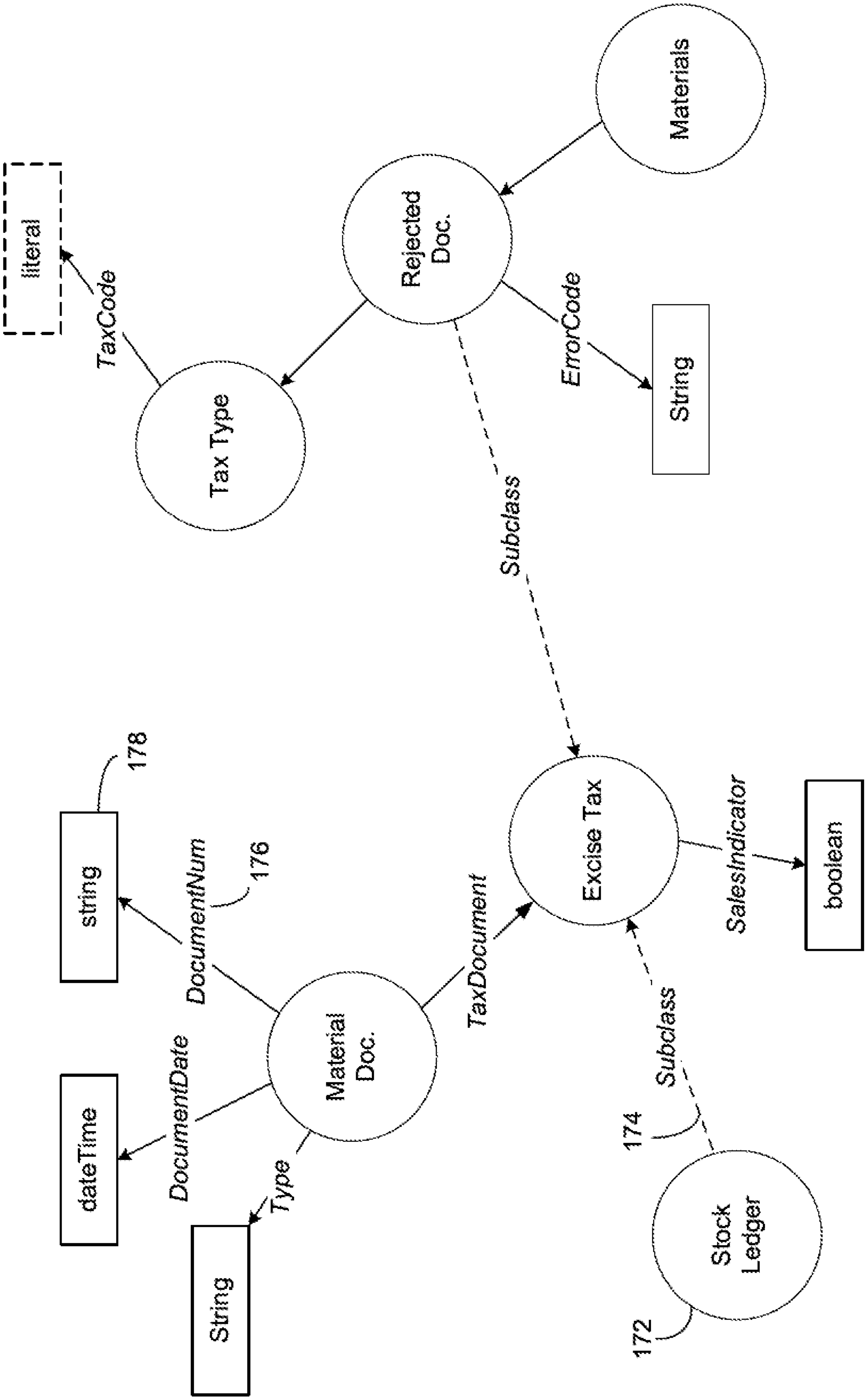
FIG. 1B is a diagram illustrating a semantic model that includes business logic of a software extension in accordance with example embodiments.

FIG. 1B illustrates a semantic model 170 that includes business logic of a software extension in accordance with example embodiments. As an example, the semantic model 170 may be just a small portion of the ontology 140 shown in FIG. 1A, and it may include the business logic of the extension added to the software application 130 in FIG. 1A. Here, the semantic model 170 is a graph with nodes 172 interconnected by edges 174. The nodes 172 may represent entities such as documents, people, locations, processes, data, and the like. The nodes 172 may include rules encoded therein. The edges 174 may include relationships between the entities such as dependencies and class relationships such as subclasses, data flows such as documents that flow between the entities, and the like. The semantic model 170 may also include variables 176 such as data values and the like within the entities, and types 178 of the data values such as strings, integers, literals, and the like.

In particular, in the example of FIG. 1B, the semantic model 170 includes logic for determining an excise tax value for a sales order. The logic may be included within the nodes and edges, as well as the data values and types. The logic may be executed by the semantic service 125 shown in FIG. 1B, by traversing the nodes 172 and edges 174 of the semantic model 170 shown in FIG. 1B.

Figure 2A:
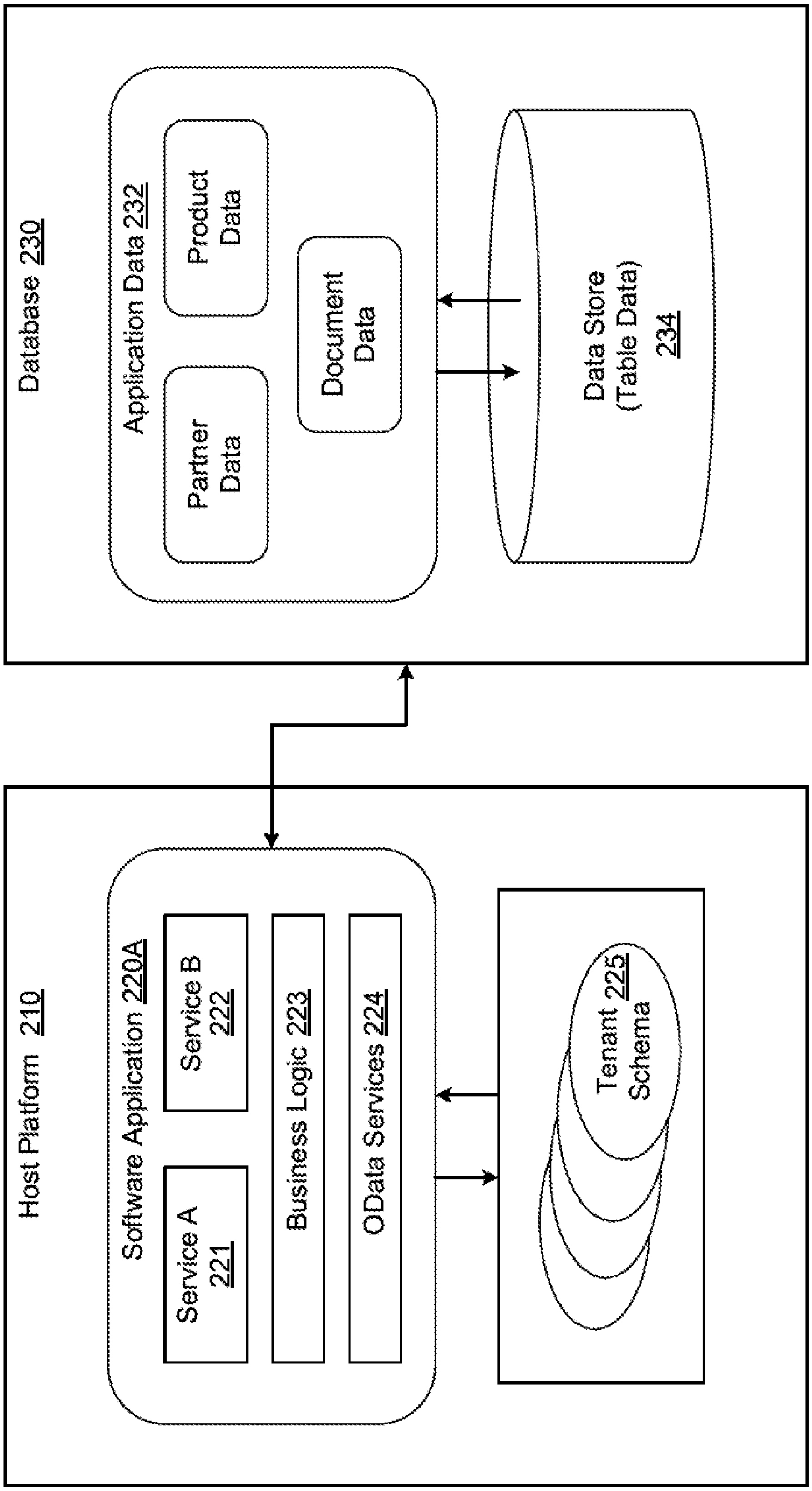
FIG. 2A is a diagram illustrating a software application prior to an extension being deployed in accordance with example embodiments.

FIG. 2A illustrates a computing environment 200 of a software application prior to an extension being deployed in accordance with example embodiments. Referring to FIG. 2A, an initial architecture 220A of a software application is shown. Here, the software application is hosted by a host platform 210 such as a cloud platform, a web server, or the like. The software application includes microservices 221 and 222, traditional business logic 223, and Open Data Protocol (OData) services 224 that can access a tenant schema 225 that provides information about table format of application data 232 contained within a database 230. As an example, the database 230 may be a relational database but the example embodiments are not limited thereto.

The database 230 may store the application data 232 in the form of data records. The application data 232 can include documents, product information, sales, accounting data, supply chain data, manufacturing data, materials data, and the like. Here, the data may be stored in database tables within a data store 234 of the database 230. The database tables may have a tabular format that includes columns and rows of data. The data store 234 may be queried by the software application based on the tenant schema 225.

Figure 2B:
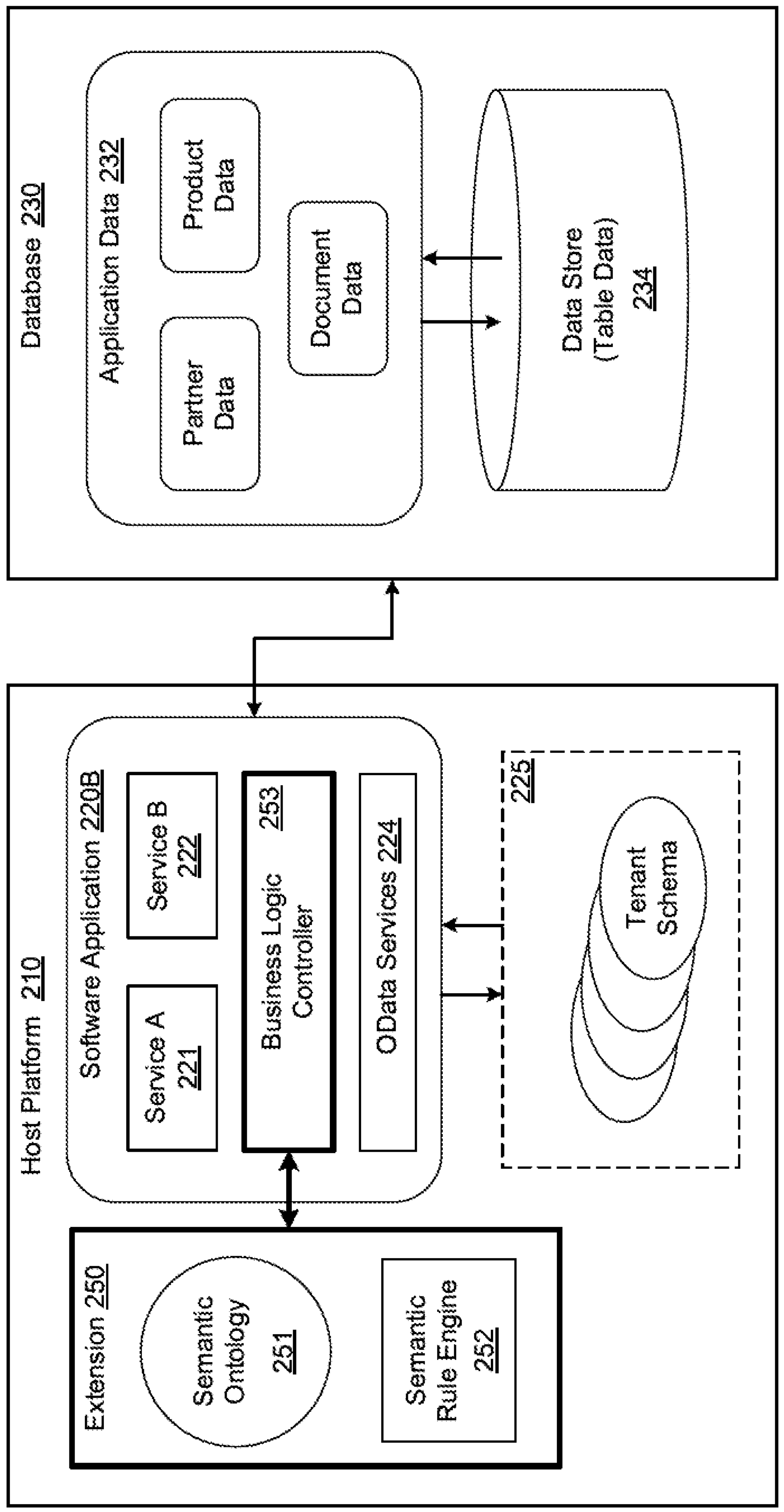
FIG. 2B is a diagram illustrating a software application after an extension has been deployed in accordance with example embodiments.

In the example embodiments, the initial architecture 220A of the software application may be converted into an architecture 220B as shown in the computing environment 240 of FIG. 2B. In particular, in FIG. 2B, an extension 250 to the software application is installed thereby modifying the software application into the architecture 220B shown in FIG. 2B. Here, the extension 250 may correspond to the semantic service 125 shown in FIG. 1A. The extension 250 may include all of the component shown in the semantic service 125 in FIG. 1A, however, for convenience, only the ontology 251 and rule engine 252 (e.g., a semantic rules engine, etc.) are shown.

The extension 250 also relies on a business logic controller 253 which may be part of the original business logic of the software application or otherwise integrated into the business logic of the software application and enables the rule engine 252 to be called via an API (not shown). The business logic controller 253 can perform the steps of the business logic controller 121 described with respect to FIG. 1A. The rule engine 252 can execute the logic based on the semantic model of the extension's logic which is stored in the ontology 251. The logic itself may have different versions that may be identified by a unique identifier among other versions of the logic stored within the ontology 251.

The new architecture of the software application may be activated on the host platform 210. For example, the software application may be restarted or otherwise refreshed to enable the changes to the architecture to be implemented.

Figure 3:
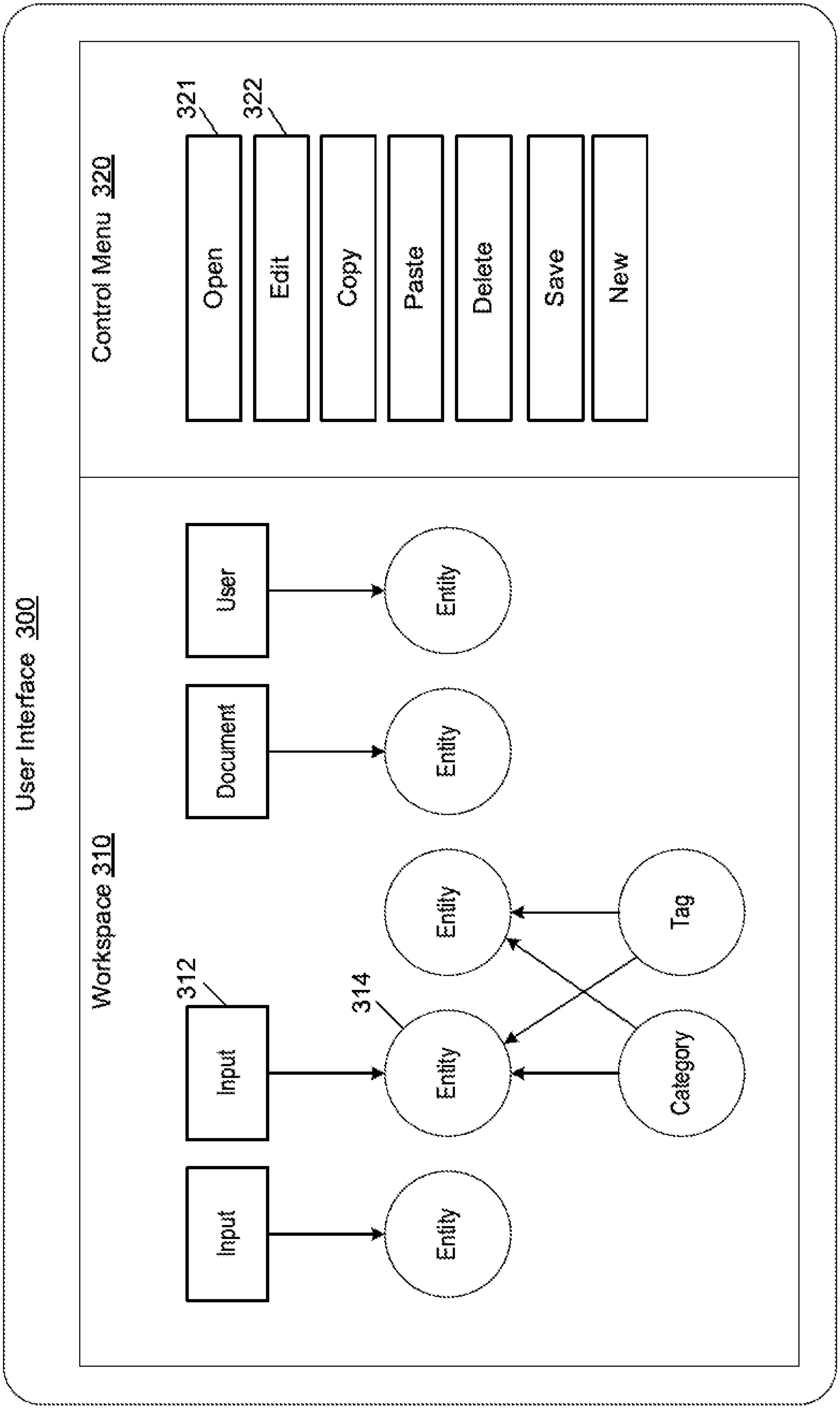
FIG. 3 is a diagram illustrating a user interface for modifying a software extension in accordance with example embodiments.

FIG. 3 illustrates a user interface 300 for modifying semantic logic stored within the ontology 140 and the ontology 251 described in the examples of FIG. 1A and FIG. 2B. Referring to FIG. 3, the semantic service 125 may provide an API or other means by which an external developer such as developer 110 in FIG. 1A is able to access and modify the semantic logic of an extension to a software application of the developer 110.

In the example of FIG. 3, the user interface includes a workspace 310 with a visualization of the semantic logic therein and a menu 320 with controls. A user/developer may manipulate the controls within the menu 320 to make changes to the business logic within the semantic model displayed within the workspace 310 of the user interface 300. When the user is finished, the changes may be updated within the extension. For example, the user may open an extension by pressing on a control button 321 and edit the extension by pressing a control button 322. The user may then use an input mechanism such as a mouse, keyboard, finger, etc., to manipulate an input 312 to an entity, a rule stored within an entity 314, or the like. The user may also manipulate the rules and the interconnections as well.

Figure 4:
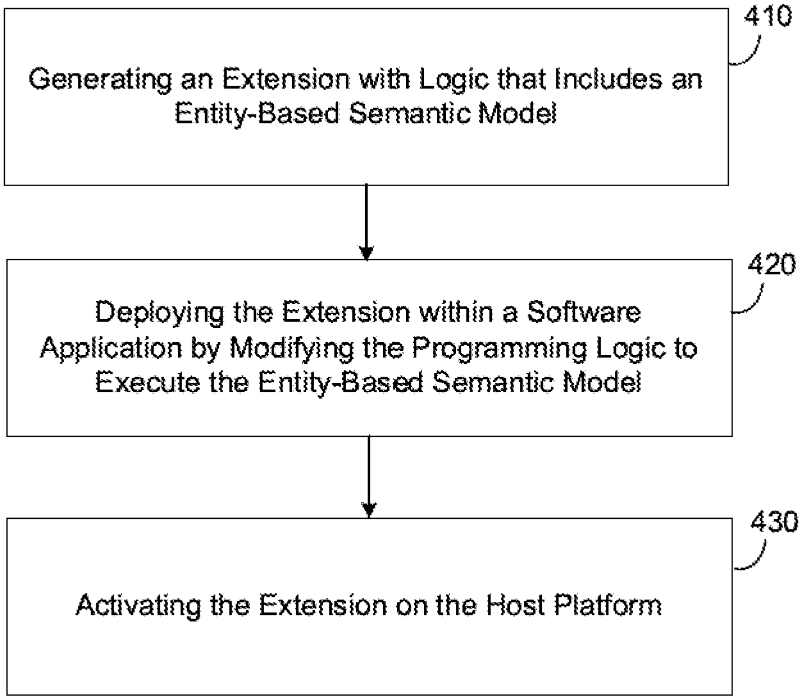
FIG. 4 is a diagram illustrating a method of deploying an extension with a semantic model in accordance with example embodiments.

FIG. 4 illustrates a method 400 of deploying an extension with a semantic model in accordance with example embodiments. For example, the method 400 may be performed by a database node, a cloud platform, a server, a computing system (user device), a combination of devices/nodes, or the like. Referring to FIG. 4, in 410, the method may include generating an extension that includes logic for a software application hosted on a host platform, wherein the logic comprises an entity-based semantic model. The entity-based semantic model may be a graph that includes nodes representing entities and edges interconnecting the nodes and representing relationships between the entities.

In 420, the method may include deploying the extension within the software application on the host platform, wherein the deploying comprises modifying the programming logic of the software application to execute the entity-based semantic model. In 430, the method may include activating the extension within the software application on the host platform. In some embodiments, the modifying may include modifying the programming logic of the software application to insert the entity-based semantic model between pre logic and post logic of the programming logic of the software application. In some embodiments, the method may further include displaying a list of custom extensions for the software application via a user interface and receiving a selection of the extension from among the list of custom extensions based on a user input via the user interface.

In some embodiments, the entity-based semantic model may include a graph that includes nodes representing entities and edges connecting the nodes representing relationships among the entities, wherein the entities comprise people, places and things. In some embodiments, the method may further include receiving a request for logic execution from a software process via an application programming interface (API) of the software application, and in response, executing the received request based on the entity-based semantic model included in the extension and returning the results of the execution to the software process.

In some embodiments, the method may further include displaying a user interface within an integrated development environment (IDE) which provides access to the entity-based semantic model. In some embodiments, the method may further include customizing the extension based on user input requesting changes to the entity-based semantic model via the user interface within the IDE. In some embodiments, the installing may include generating a parallel architecture within the programming logic of the software application which enables the software application to access the entity-based semantic model and a relational database.

Figure 5:
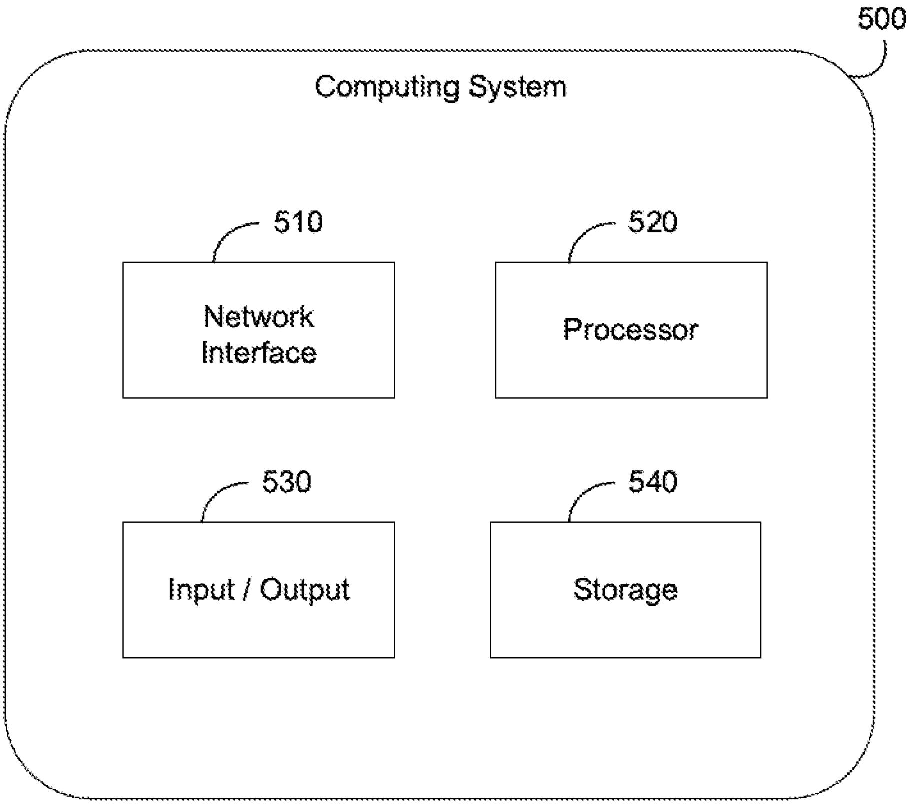
FIG. 5 is a diagram illustrating a computing system for use in the examples herein in accordance with example embodiments.

FIG. 5 illustrates a computing system 500 that may be used in any of the methods and processes described herein, in accordance with an example embodiment. For example, the computing system 500 may be a database node, a server, a cloud platform, or the like. In some embodiments, the computing system 500 may be distributed across multiple computing devices such as multiple database nodes. Referring to FIG. 5, the computing system 500 includes a network interface 510, a processor 520, an input/output 530, and a storage 540 such as an in-memory storage, and the like. Although not shown in FIG. 5, the computing system 500 may also include or be electronically connected to other components such as a display, an input unit(s), a receiver, a transmitter, a persistent disk, and the like. The processor 520 may control the other components of the computing system 500.

The network interface 510 may transmit and receive data over a network such as the Internet, a private network, a public network, an enterprise network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable. The input/output 530 may include an interface, a port, a cable, a bus, a board, a wire, and the like, for inputting and outputting data to and from the computing system 500. For example, data may be output to an embedded display of the computing system 500, an externally connected display, a display connected to the cloud, another device, and the like. The network interface 510, the input/output 530, the storage 540, or a combination thereof, may interact with applications executing on other devices.

The storage 540 is not limited to a particular storage device and may include any known memory device such as RAM, ROM, hard disk, and the like, and may or may not be included within a database system, a cloud environment, a web server, or the like. The storage 540 may store software modules or other instructions which can be executed by the processor 520 to perform the method shown in FIG. 4. According to various embodiments, the storage 540 may include a data store having a plurality of tables, records, partitions and sub-partitions. The storage 540 may be used to store database records, documents, entries, and the like.

As an example, the processor 520 may be configured to generate an extension that includes logic for a software application hosted on a host platform. According to various embodiments, the logic may include an entity-based semantic model such as a graph in which nodes are connected to each other via edges. The nodes represent entities of the logic included in the software extension and the edges represent relationships among the entities. The processor 520 may install the extension within the software application on the host platform. During the install, the processor 520 may modify the original programming logic of the software application to execute the entity-based semantic model. The processor 520 may also activate the extension within the software application on the host platform.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
- a processor configured to:
  - generate a user interface;
  - receive a first user input, via the user interface, the user input relating to a software application capable of performing an initial set of features;
  - generate, based on the first user input, an extension comprising logic for the software application hosted on a host platform to cause the software application to perform one or more additional features not in the initial set of features, the extension comprising a semantic rule engine, wherein the logic comprises an entity-based semantic model;
  - deploy the extension within the software application on the host platform, wherein the processor modifies programming logic of the software application to execute the entity-based semantic model during the deployment, wherein modifying the programming logic of the software application comprises inserting the entity-based semantic model between pre logic and post logic of the programming logic of the software application;
  - activate the extension within the software application on the host platform;
  - receive a second user input, via the user interface, the second user input comprising a modification to the entity-based semantic model;
  - update the programming logic of the software application, within the current deployment of the extension, to include the modification to the entity-based semantic model indicated by the second user input,
  - wherein the processor is further configured to receive a request for logic execution from a software process via an application programming interface (API) of the software application, and in response, execute the received request based on the entity-based semantic model included in the extension and return results of the execution to the software process; and
  - wherein the processor is configured to generate a parallel architecture within the programming logic of the software application which enables the software application to access the entity-based semantic model and a relational database.

2. The computing system of claim 1, wherein the processor is configured to display a list of custom extensions for the software application via a user interface and detect a selection of the extension from among the list of custom extensions based on a user input via the user interface.

3. The computing system of claim 1, wherein the entity-based semantic model comprises a graph that includes nodes that represent entities and edges that connect the nodes and that represent relationships among the entities.

4. The computing system of claim 1, wherein the processor is further configured to display a user interface within an integrated development environment (IDE) which provides access to the entity-based semantic model.

5. The computing system of claim 4, wherein the processor is further configured to customize the entity-based semantic model within the extension based on user input that requests changes to the entity-based semantic model via the user interface within the IDE.

6. A method comprising:
- generating a user interface;
- receiving a first user input, via the user interface, the user input relating to a software application capable of performing an initial set of features;
- generating, based on the first user input, an extension comprising logic for the software application hosted on a host platform to cause the software application to perform one or more additional features not in the initial set of features, the extension comprising a semantic rule engine, wherein the logic comprises an entity-based semantic model;
- deploying the extension within the software application on the host platform, wherein the deploying comprises modifying programming logic of the software application to execute the entity-based semantic model, the modifying the programming logic of the software application comprising inserting the entity-based semantic model between pre logic and post logic of the programming logic of the software application;

activating the extension within the software application on the host platform;

receiving a second user input, via the user interface, the second user input comprising a modification to the entity-based semantic model; and updating the programming logic of the software application, within the current deployment of the extension, to include the modification to the entity-based semantic model indicated by the second user input;

receiving a request for logic execution from a software process via an application programming interface (API) of the software application, and in response, executing the received request based on the entity-based semantic model included in the extension and returning results of the execution to the software process; and wherein the deploying comprises generating a parallel architecture within the programming logic of the software application which enables the software application to access the entity-based semantic model and a relational database.

7. The method of claim 6, wherein the method further comprises displaying a list of custom extensions for the software application via a user interface and receiving a selection of the extension from among the list of custom extensions based on a user input via the user interface.

8. The method of claim 6, wherein the entity-based semantic model comprises a graph that includes nodes representing entities and edges connecting the nodes representing relationships among the entities.

9. The method of claim 6, wherein the method further comprises displaying a user interface within an integrated development environment (IDE) which provides access to the entity-based semantic model.

10. The method of claim 9, wherein the method further customizing the extension based on user input requesting changes to the entity-based semantic model via the user interface within the IDE.

11. A non-transitory computer-readable medium comprising instructions which when executed by a processor cause a computer to perform a method comprising:

generating a user interface;

receiving a first user input, via the user interface, the user input relating to a software application capable of performing an initial set of features;

generating, based on the first user input, an extension comprising logic for the software application hosted on a host platform to cause the software application to perform one or more additional features not in the initial set of features, the extension comprising a semantic rule engine, wherein the logic comprises an entity-based semantic model;

deploying the extension within the software application on the host platform, wherein the deploying comprises modifying programming logic of the software application to execute the entity-based semantic model, the modifying the programming logic of the software application comprising inserting the entity-based semantic model between pre logic and post logic of the programming logic of the software application;

activating the extension within the software application on the host platform;

receiving a second user input, via the user interface, the second user input comprising a modification to the entity-based semantic model;

updating the programming logic of the software application, within the current deployment of the extension, to include the modification to the entity-based semantic model indicated by the second user input;

wherein the method further comprises receiving a request for logic execution from a software process via an application programming interface (API) of the software application, and in response, executing the received request based on the entity-based semantic model included in the extension and returning results of the execution to the software process; and wherein the deploying comprises generating a parallel architecture within the programming logic of the software application which enables the software application to access the entity-based semantic model and a relational database.

12. The non-transitory computer-readable medium of claim 11, wherein the method further comprises displaying a list of custom extensions for the software application via a user interface and receiving a selection of the extension from among the list of custom extensions based on a user input via the user interface.

* * * * *